United States Patent
Gudell et al.

(10) Patent No.: US 9,521,698 B1
(45) Date of Patent: Dec. 13, 2016

(54) WIRELESS NETWORK INTERCONNECTION

(71) Applicant: Bose Corporation, Framingham, MA (US)

(72) Inventors: Marc Nicolas Gudell, Milford, MA (US); Matthew Christopher Smith, Needham Heights, MA (US); Michael Balma, Waltham, MA (US); Johnas Cukier, Needham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 14/848,254

(22) Filed: Sep. 8, 2015

(51) Int. Cl.
*H04W 76/02* (2009.01)
*H04L 29/12* (2006.01)
*H04W 4/00* (2009.01)
*H04W 76/06* (2009.01)

(52) U.S. Cl.
CPC ........ *H04W 76/023* (2013.01); *H04L 61/2007* (2013.01); *H04W 4/008* (2013.01); *H04W 76/064* (2013.01)

(58) Field of Classification Search
CPC ............................. H04W 12/06; H04W 4/008
See application file for complete search history.

(56) References Cited

U.S. PATENT DOCUMENTS

| | | | |
|---|---|---|---|
| 9,066,230 B1 * | 6/2015 | Paczkowski | H04W 12/06 |
| 9,078,072 B2 | 7/2015 | Sundaresan et al. | |
| 2014/0277644 A1 | 9/2014 | Gomes-Casseres et al. | |
| 2014/0380443 A1 * | 12/2014 | Stark | H04W 12/08 726/7 |

* cited by examiner

*Primary Examiner* — Tuan H Nguyen
(74) *Attorney, Agent, or Firm* — Brian M. Dingman; Dingman IP Law, PC

(57) ABSTRACT

A method of connecting a first computing device and a wireless access point over a first wireless network using a second computing device, where the first and second computing devices are both enabled to communicate over the first wireless network and are both enabled to communicate over a second, different wireless network, and where there are first wireless network connection credentials for the wireless access point. The method includes establishing a wireless connection between the first and second computing devices over the second wireless network, sending the first wireless network connection credentials for the wireless access point from the second computing device to the first computing device over the second wireless network, and then establishing a connection between the first computing device and the wireless access point on the first network using the first wireless network connection credentials for the wireless access point.

12 Claims, 5 Drawing Sheets

WIRELESS NETWORK INTERCONNECTION

BACKGROUND

This disclosure relates to interconnecting computer devices over wireless networks.

Computing devices can be connected over wireless networks, for example over WiFi. In order to connect, the devices need the network credentials, which often include the network name (SSID), password, network key, or any secret that authenticates a new network node. This interconnection process can be relatively complex, requiring user intervention. It can also involve a user opening multiple menus or applications on a device, which can be difficult and confusing.

As one non-limiting example, when a mobile computing device such as a smartphone or tablet is used to setup a wireless speaker package, a setup application for the wireless speaker package may be downloaded onto the device. Ultimately what is needed (or at least desirable in some circumstances) is for the device and the wireless speaker package to communicate over an available WiFi network. Some mobile computing devices, such as those running iOS®, do not allow an app to modify a WiFi setting in the device. In these cases, the user must enter the WiFi network credentials in the settings menu of the device, and then use the app to setup and connect the wireless speaker package. This process is cumbersome and can lead to difficulties in the wireless speaker package setup process.

SUMMARY

Connection of two computing devices, e.g., a wireless speaker package and a mobile computing device, over a first wireless network, e.g., a WiFi network, can be simplified by first pairing the speaker package and device over a second network such as a Bluetooth Low Energy (BLE) network. BLE can be used to pass the WiFi network credentials from the device to the speaker package. The speaker package may then connect to the WiFi router using these credentials.

All examples and features mentioned below can be combined in any technically possible way.

In one aspect, featured herein is a method of connecting a first computing device and a wireless access point over a first wireless network using a second computing device, where the first and second computing devices are both enabled to communicate over the first wireless network and are both enabled to communicate over a second, different wireless network, and where there are first wireless network connection credentials for the wireless access point. This method includes establishing a wireless connection between the first and second computing devices over the second wireless network, and sending the first wireless network connection credentials for the wireless access point from the second computing device to the first computing device over the second wireless network. A connection is then established between the first computing device and the wireless access point on the first network using the first wireless network connection credentials for the wireless access point.

Embodiments may include one of the following features, or any combination thereof. The second computing device may be a mobile device. The second computing device may be a smartphone or a tablet, for example. The first computing device may be a wireless speaker package. The first network may be a WiFi network. The second network may be a Bluetooth Low Energy (BLE) network. More generally, the communication over the first wireless network may be via a first wireless communication protocol and the communication over the second wireless network may be via a second wireless communication protocol, wherein the first and second wireless communication protocols are different.

Embodiments may include one of the following features, or any combination thereof. The method may further include using the second network to obtain an IP address of the first computing device. The method may further include using the IP address of the first computing device to establish communication between the first and second computing devices over the first network. The method may further include, after obtaining an IP address of the first computing device, disabling the connection between the first and second computing devices over the second network.

In another aspect, a mobile computing device includes a processor and memory comprising instructions which when executed by the processor cause the mobile device to establish a connection to a wireless speaker package over a second wireless network, while maintaining communication with a wireless access point over a first wireless network, provide credentials to the wireless speaker package which allow the wireless speaker package to establish communication with the wireless access point over the first wireless network, and drop the connection to the wireless speaker package over the second wireless network upon receiving confirmation that the wireless speaker package established communication with the wireless access point over the first wireless network.

Embodiments may include one of the following features, or any combination thereof. The memory may further comprise instructions which when executed by the processor cause the mobile computing device to communicate with the wireless speaker package via the first wireless network. The communication over the first wireless network may be via a first wireless communication protocol and the communication over the second wireless network may be via a second wireless communication protocol, wherein the first and second wireless communication protocols are different. The first network may be a WiFi network and the second network may be a Bluetooth Low Energy (BLE) network.

Embodiments may include one of the following features, or any combination thereof. The memory may further comprise instructions which when executed by the processor cause the mobile device to obtain an IP address of the wireless speaker package using the second network. The memory may further comprise instructions which when executed by the processor cause the mobile device to use the IP address of the wireless speaker package to establish communication between the mobile computing device and the wireless speaker package over the first network.

In another aspect, a wireless speaker package includes an electro-acoustic transducer, a processor, and memory comprising instructions which when executed by the processor cause the wireless speaker package to establish a connection with a wireless device via a second wireless network, receive credentials from the wireless device over the second wireless network, and use the credentials to establish a connection with a wireless access point over a first wireless network while maintaining the connection with the wireless device over the second wireless network.

Embodiments may include one of the following features, or any combination thereof. The communication over the first wireless network may be via a first wireless communication protocol and the communication over the second wireless network may be via a second wireless communication protocol, wherein the first and second wireless communication protocols are different. The first network may be a WiFi network and the second network may be a Bluetooth Low Energy (BLE) network.

Embodiments may include one of the following features, or any combination thereof. The memory may further include instructions which when executed by the processor cause the wireless speaker package to send an IP address of the wireless speaker package to the wireless device. The memory may further include instructions which when executed by the processor cause the wireless speaker package to establish communication between the mobile computing device and the wireless speaker package over the first network. The memory may further include instructions which when executed by the processor cause the wireless speaker package to disable the connection between the wireless speaker package and the wireless device over the second network.

DETAILED DESCRIPTION

Figure 1:
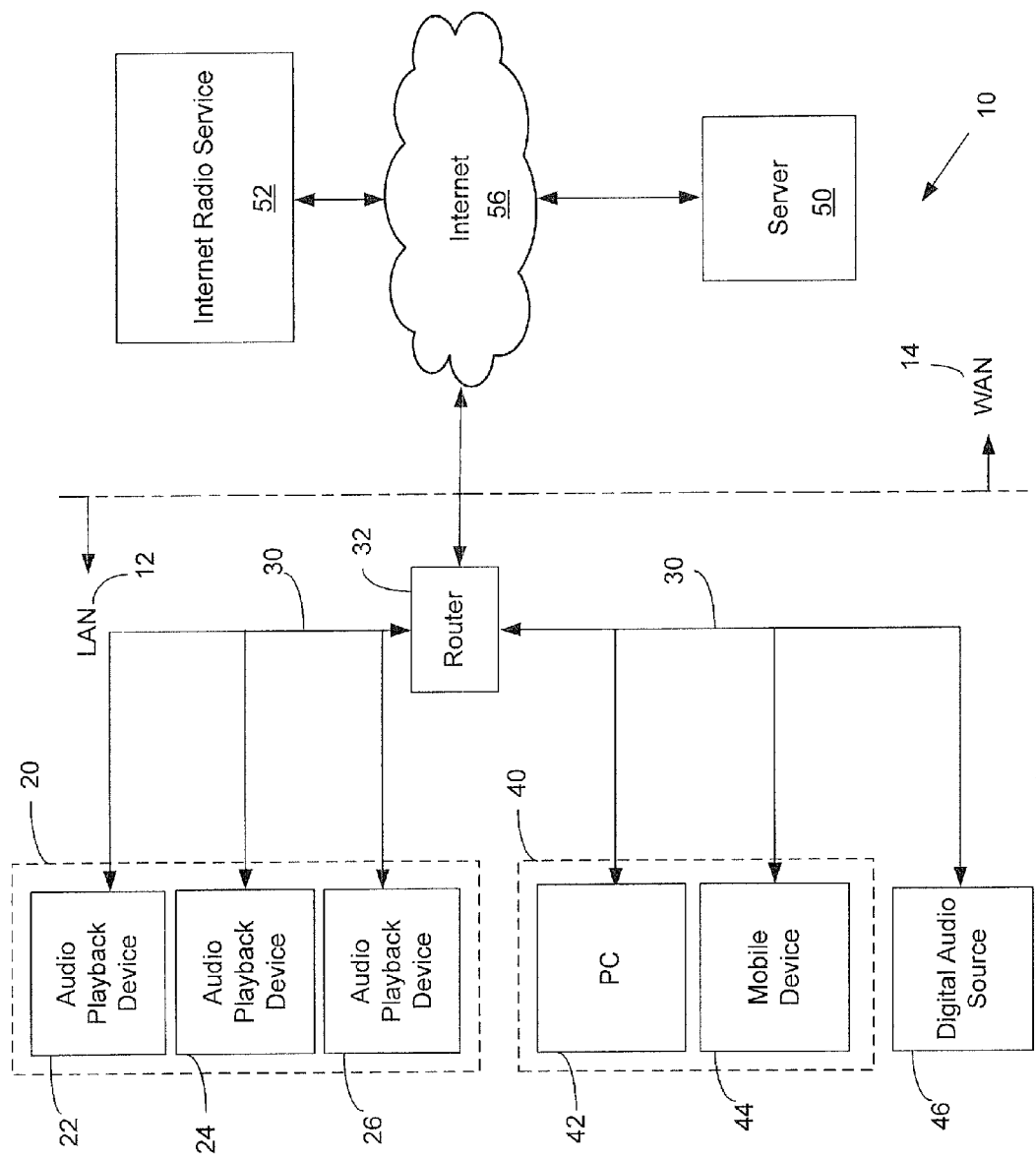
FIG. 1 is a schematic block diagram of an audio distribution system that is one example of a method, wireless speaker package and mobile computing device according to this disclosure.

Connection of a wireless speaker package to a mobile computing device over a WiFi network can be simplified by first pairing the speaker package and the device over a second network such as a Bluetooth. Low Energy (BLE) network. BLE can be used to pass the WiFi network credentials from the device to the speaker package. The speaker package may then connect to the WiFi router using these credentials.

Elements of the figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in a block diagram or swim lane diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Audio distribution system 10, FIG. 1, can be used to accomplish a method of connecting a first computing device and a wireless access point over a first wireless network using a second computing device, and also includes non-limiting examples of computing devices that can be involved in the subject method. System 10 is adapted to deliver digital audio (e.g., digital music). System 10 includes a number of audio playback devices 22, 24 and 26 which are among the group of audio output devices 20 of the system. In one non-limiting embodiment, the audio playback devices are identical wireless speaker packages that each include a digital to analog converter that is able to receive digital audio signals and convert them to analog form. The wireless speaker packages also include an electro-acoustic transducer that receives the analog audio signals and transduces them into sound. The wireless speaker packages also include a processor. The wireless speaker packages can be connected to one another and also connected to the router/access point 32 via network 30. The wireless speaker packages are thus able to communicate with one another. Network 30 can be a wired and/or wireless network, and can use known network connectivity methodologies. Network 30 is part of local area network (LAN) 12 which is connected to wide area network (WAN) 14, in this non-limiting example by connection to Internet 56. LAN 12 also includes one or more separate computing devices 40 and one or more separate local digital audio sources 46. In this non-limiting example the computing devices include a personal computer 42 and a mobile computing device 44 such as a smartphone, tablet or the like. WAN 14 includes server 50 and Internet radio service 52 which can both communicate with LAN 12 via Internet 56.

One use of system 10 is to play an audio stream over one or more of the audio playback devices in group 20. The sources of digital audio provide access to content such as audio streams that move over network 30 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 46, and media server applications such as may be found on a mobile computing device, can also be sources of audio data. Typically, the user selects the audio source and the playback devices via PC 42 and/or mobile device 44.

When an audio playback device such as a wireless speaker package is first added to system 10, it needs to be enabled to wirelessly communicate with router (i.e., wireless access point) 32 over wireless network 30. However, the wireless speaker package does not have the necessary credentials to join the network, such as the WiFi network name and the network password. Accordingly, during device setup the network credentials need to be passed to the wireless speaker package.

When a mobile computing device such as a smartphone or tablet is used to setup a wireless speaker package, a setup application for the wireless speaker package may be downloaded onto the device. Ultimately what is needed (or at least desirable in some circumstances) is for the device and the wireless speaker package to communicate over an available WiFi network. Some devices, such as those running iOS®, do not allow an app to modify a WiFi setting. In these cases, the user must enter the WiFi network credentials in the settings menu of the device, and then use the app to setup and connect the wireless speaker package. This multi-step process is cumbersome and can lead to difficulties in the wireless speaker package setup process.

In the present disclosure, wireless speaker package setup is facilitated on devices running iOS®. The device and the wireless speaker package are initially connected over a different wireless network that uses a different wireless communication protocol than WiFi. In one non-limiting example, the initial connection can use the Bluetooth Low Energy (BLE) protocol; BLE connections can be established in iOS®-enabled devices from the wireless speaker package setup app, without the need to use the device's settings menu. Once the BLE connection is established, WiFi credentials are sent from the device to the wireless speaker package over the BLE network. After the wireless speaker package is connected to the WiFi network, the BLE connection can be dropped. All further communication between the device and the wireless speaker package can then take place over the WiFi network.

Figure 2:
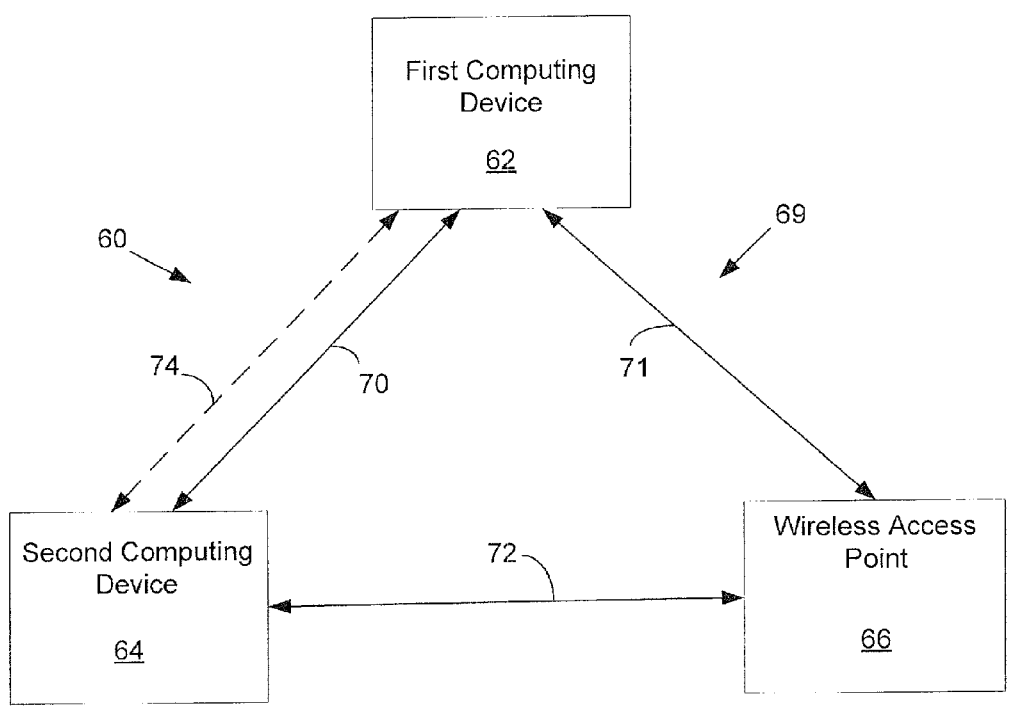
FIG. 2 is a schematic block diagram of a wireless interconnection of two computing devices and a wireless access point.

FIG. 2 is a simplified block diagram of a wireless communication scheme 60 between a first computing device 62, a second computing device 64 and a wireless access point 66. All of the devices communicate persistently over a first wireless network 69 consisting of wireless connections 70, 71 and 72. This first wireless network 69 may use a WiFi communication protocol, or may use any other wireless network communication protocol now known, or developed hereafter. Initially and temporarily, devices 62 and 64 wirelessly communicate over a second wireless network 74 that uses a wireless communication protocol that is different than the protocol used by the first network. In one non-limiting example, the second wireless network 74 can use the BLE protocol, or a different Bluetooth protocol, or any other type of wireless communication protocol, now known or hereafter developed. Network 74 can be used to provide for sufficient communication between devices 62 and 64 so as to allow one or both devices to join first network 69.

Figure 3:
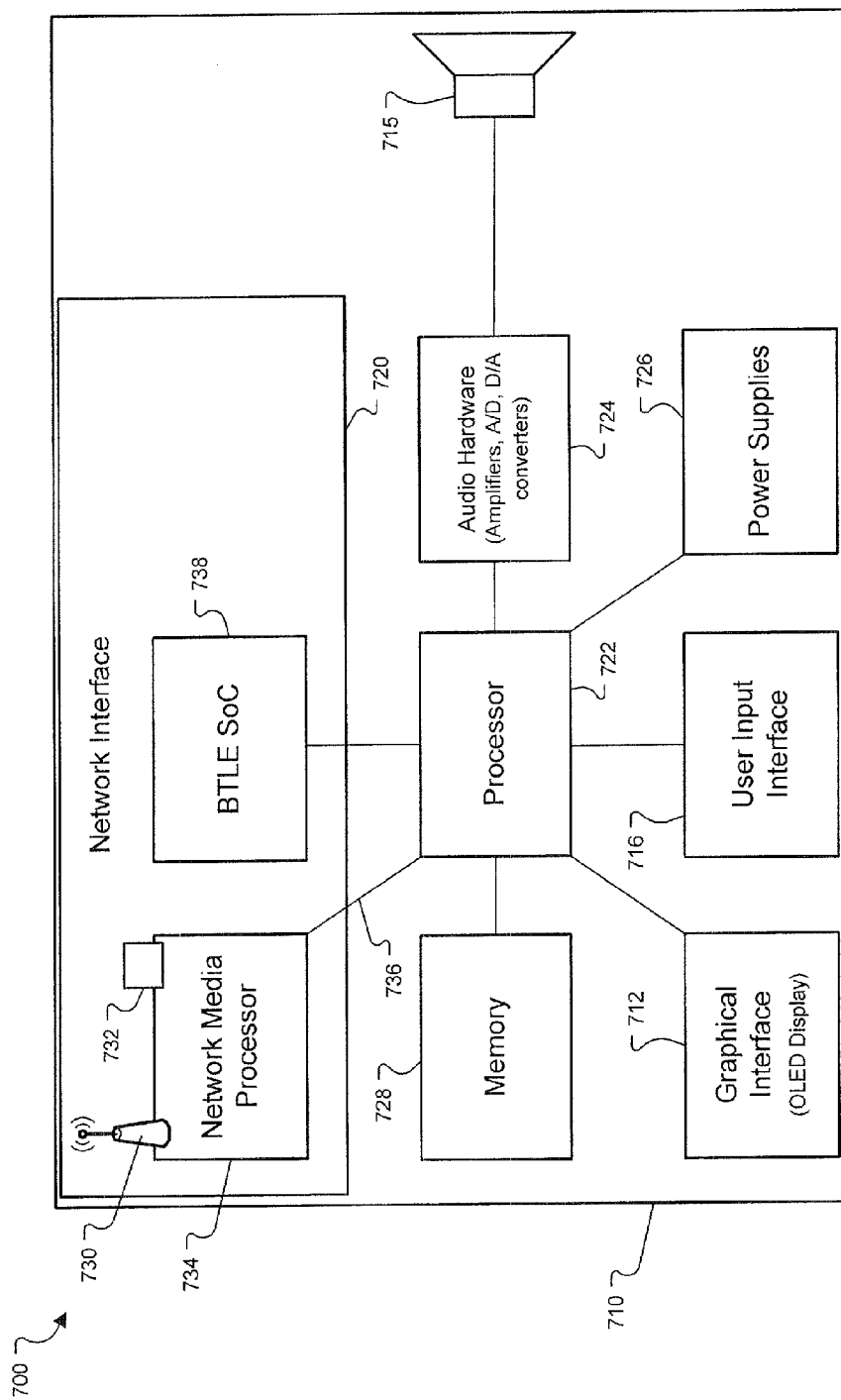
FIG. 3 is a block diagram of an exemplary wireless speaker package.

FIG. 3 illustrates an exemplary wireless speaker package of an example of this disclosure. Audio playback device 700 includes an enclosure 710. On the enclosure 710 there resides a graphical interface 712 (e.g., an OLED display) which can provide the user with information regarding currently playing ("Now Playing") music and information regarding the presets. There are one or more electro-acoustic transducers 715. The audio playback device 700 also includes a user input interface 716. The user input interface 716 can include a plurality of preset indicators, which can be hardware buttons. The preset indicators can provide the user with easy, one press access to entities assigned to those buttons. That is, a single press of a selected one of the preset indicators will initiate streaming and rendering of content from the assigned entity. The assigned entities can be associated with different ones of the digital audio sources such that a single audio playback device 700 can provide for single press access to various different digital audio sources. In one example, the assigned entities include at least (i) user-defined playlists of digital music and (ii) Internet radio stations. In another example, the digital audio sources include a plurality of Internet radio sites, and the assigned entities include individual radio stations provided by those Internet radio sites.

Audio playback device 700 also includes a network interface 720, a processor 722, audio hardware 724, power supplies 726 for powering the various audio playback device components, and memory 728. Each of the processor 722, the graphical interface 712, the network interface 720, the processor 722, the audio hardware 724, the power supplies 726, and the memory 728 are interconnected using various buses, and several of the components may be mounted on a common motherboard or in other manners as appropriate.

The network interface 720 provides for communication between the audio playback device 700 and audio sources and other networked audio playback devices via one or more communications protocols. The network interface 720 may provide either or both of a wireless interface 730 and a wired interface 732. The wireless interface 730 allows the audio playback device 700 to communicate wirelessly with other devices in accordance with a communication protocol such as such as IEEE 802.11 b/g. The wired interface 732 provides network interface functions via a wired (e.g., Ethernet) connection.

In some cases, the network interface 720 may also include a network media processor 734 for supporting Apple AirPlay® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device.

All other digital audio coming from network packets comes straight from the network media processor 734 through a USB bridge 736 to the processor 722 and runs into the decoders, DSP, and eventually is played back (rendered) via the electro-acoustic transducer(s) 715.

The network interface 720 can also include a Bluetooth low energy (BLE) system-on-chip (SoC) 738 for Bluetooth low energy applications (e.g., for wireless communication with a Bluetooth enabled computing device). A suitable BLE SoC is the CC2540 available from Texas Instruments, with headquarters in Dallas, Tex.

Streamed data passes from the network interface 720 to the processor 722. The processor 722 can execute instructions within the audio playback device (e.g., for performing, among other things, digital signal processing, decoding, and equalization functions), including instructions stored in the memory 728. The processor 722 may be implemented as a chipset of chips that include separate and multiple analog and digital processors. The processor 722 may provide, for example, for coordination of other components of the audio playback device 700, such as control of user interfaces, applications run by the audio playback device 700. A suitable processor is the DA921 available from Texas Instruments.

The processor 722 provides a processed digital audio signal to the audio hardware 724 which includes one or more digital-to-analog (D/A) converters for converting the digital audio signal to an analog audio signal. The audio hardware 724 also includes one or more amplifiers which provide amplified analog audio signals to the electroacoustic transducer(s) 715 for playback. In addition, the audio hardware 724 may include circuitry for processing analog input signals to provide digital audio signals for sharing with other devices.

The memory 728 stores information within the audio playback device 700. In this regard, the memory 728 may store account information, such as the preset and recent information discussed above. The memory 728 may also provide storage for "tokens" for facilitating single press access to digital audio sources (e.g., Internet radio services). A token, as used herein, is a unique identifier that may be provided by the digital audio source and which allows the digital audio source to recognize the audio playback device 700 as being associated with a user's account with the digital audio source and without requiring the user to enter credentials (e.g., user name, password, etc.) each time the audio playback device 700 attempts to access the digital audio source.

The memory 728 may include, for example, flash memory and/or non-volatile random access memory (NVRAM). In some implementations, instructions (e.g., software) are stored in an information carrier. The instructions, when executed by one or more processing devices (e.g., the processor 722), perform one or more processes, such as those described elsewhere herein. The instructions can also be stored by one or more storage devices, such as one or more computer- or machine-readable mediums (for example, the memory 728, or memory on the processor). The instructions may include instructions for performing decoding (i.e., the software modules include the audio codecs for decoding the digital audio streams), as well as digital signal processing and equalization. Additional details may be found in US Patent Application Publication 2014/0277644, the disclosure of which is incorporated herein by reference.

Figure 4A:
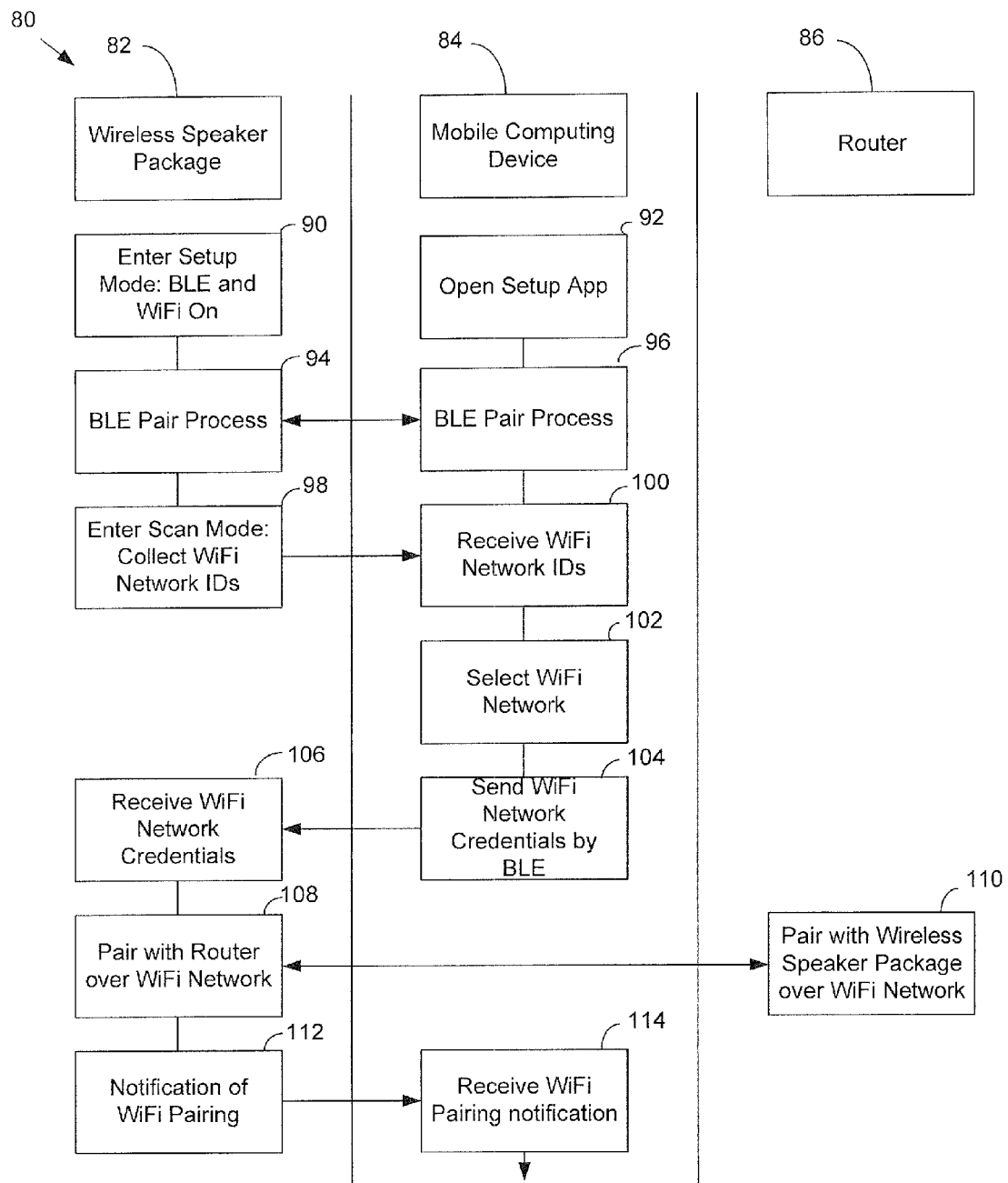
FIGS. 4A and 4B together are a swim lane diagram showing steps of connecting a wireless speaker package to a router over a WiFi network.
Figure 4B:
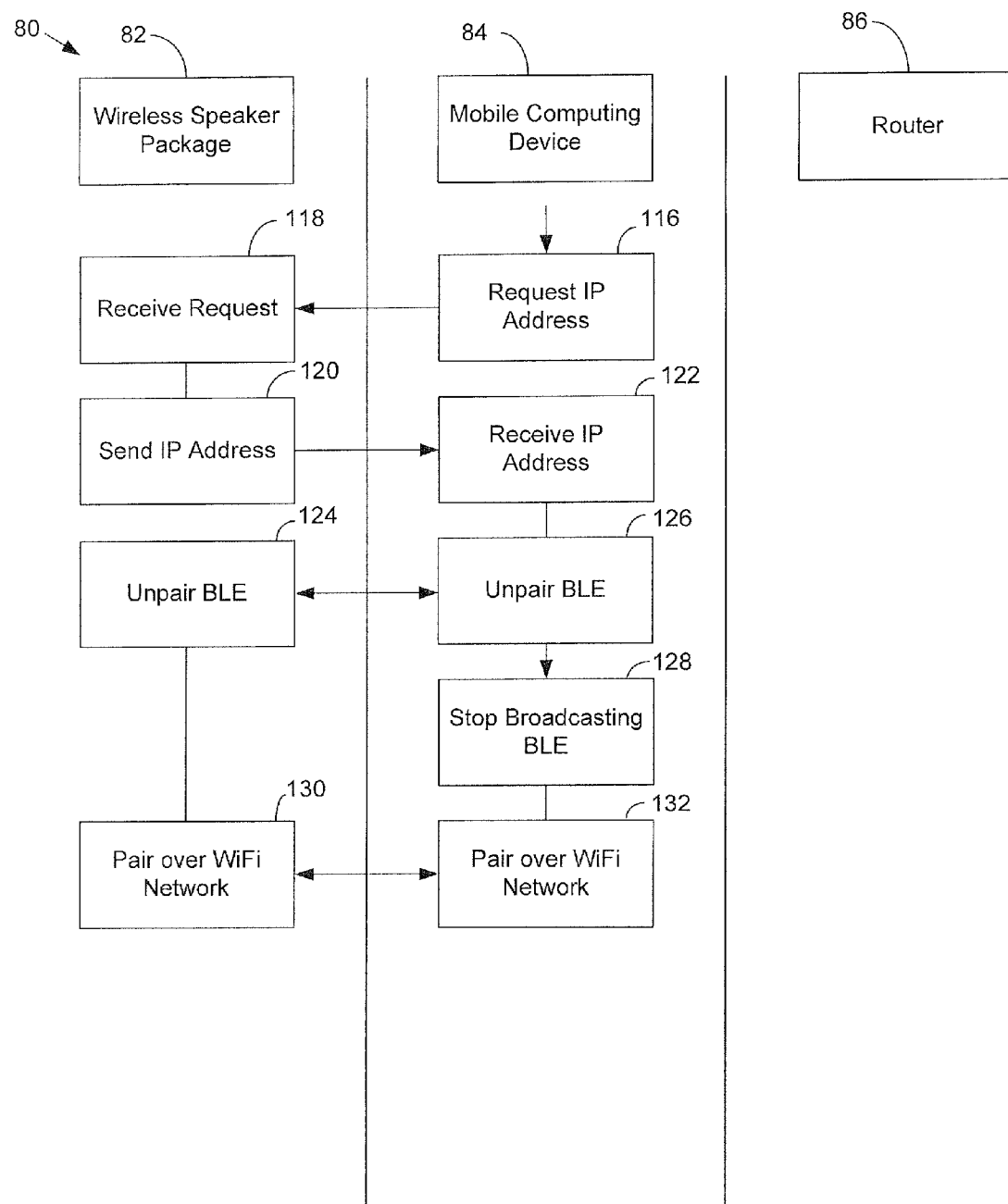

FIGS. 4A and 4B together are a swim lane diagram 80 showing steps of connecting a wireless speaker package to a router over a WiFi network. The swim lane diagram is used to show the relationship between the wireless speaker package, the mobile computing device (e.g., a smartphone or a tablet) and the router in the process and to define the steps involved in the process. The steps of FIG. 3 may be implemented on computer program code in combination with appropriate hardware. The computer program code may be stored on storage media such as a hard disk or other computer storage media, as well as a memory storage device or collection of memory storage devices such as read only memory or random access memory. Additionally the computer program code can be transferred to the devices over the Internet or another network.

Referring to FIGS. 4A and 4B, three swim lanes are shown including a lane for wireless speaker package 82, a lane for mobile computing device 84, and a lane for router 86. At step 90 the wireless speaker package enters its setup mode. Setup mode can be automatically enabled when the wireless speaker package is unboxed and first turned on. It is also possible for a user to engage setup mode, typically through simultaneously pressing two or more buttons on the device as enabled by the design of wireless speaker package 82. One non-limiting example of wireless speaker package 82 is a SoundTouch wireless speaker available from Bose Corp. of Framingham, Mass., USA. As part of setup mode, BLE and WiFi are turned on, step 90.

The user of mobile computing device 84 will have downloaded a set up application for wireless speaker package 82. The app is opened at step 92. Wireless speaker package 82 and computing device 84 next undergo a standard BLE pair process, steps 94 and 96. The BLE pair process is known in the art and essentially is accomplished as follows: when wireless speaker package 82 is in setup mode it acts as a "BLE Central" device listening for any "BLE Peripheral" devices. Mobile computing device 84 acts as a BLE peripheral device, continuously transmitting an advertisement over BLE. When package 82 receives the advertised profile it initiates a scan request. Device 84 replies to this scan request, and in response device 82 sends a connection request. The devices then connect over BLE.

After the BLE pairing, package 82 enters scan mode 98. In scan mode the package collects network identification information of all WiFi networks that it senses. This network identification information is sent to device 84 where it is received, step 100. A WiFi network is then selected using device 84, step 102. The network selection can be accomplished by the user, who will know the identification of the WiFi network of router 86. If device 84 has already been connected to this network, the device app can prioritize the WiFi network list such that the existing network is listed first; this simplifies the choice by the user. As part of the selection of the WiFi network, step 102, the user enters necessary credentials, which typically comprise a network password. Device 84 then sends the WiFi network credentials to package 82 by BLE, step 104. These network credentials received by package 82, step 106. Package 82 then uses these credentials to pair with router 86 over this WiFi network, step 108 and 110. If there is a pairing error, package 82 sends a notification to device 84. The error can then be corrected, such as by selecting another network or reentering the network password. If the pairing is successful, a notification of successful WiFi pairing 112 is sent to device 84 and received, step 114.

Mobile computing device 84 then requests the IP address from package 82, step 116. The request is received, step 118, and the IP address is sent, step 120. The address is received, step 122. Once mobile computing device 84 has the IP address of wireless speaker package 82, package 82 and device 84 are unpaired from BLE, steps 124 and 126. Device 84 then stops broadcasting BLE services, step 128. Package 82 and device 84 then connect over the WiFi network in a normal fashion, steps 130 and 132. The result is that wireless speaker package 82 and mobile computing device 84 can now communicate over WiFi, and can also communicate with other devices on network 30, as well as devices and destinations (e.g., web sites) on network 14 (FIG. 1).

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method of connecting a wireless speaker package and a wireless access point over a first wireless network using a mobile computing device, where the wireless speaker package and the mobile computing devices are both enabled to communicate over the first wireless network and are both enabled to communicate over a second, different wireless network, and where there are first wireless network connection credentials for the wireless access point, and wherein the communication over the first wireless network is via a first wireless communication protocol and the communication over the second wireless network is via a second wireless communication protocol, wherein the first and second wireless communication protocols are different, the method comprising:

establishing a wireless connection between the wireless speaker package and the mobile computing device over the second wireless network;

sending the first wireless network connection credentials for the wireless access point from the mobile computing device to the wireless speaker package over the second wireless network;

establishing a connection between the wireless speaker package and the wireless access point on the first network using the first wireless network connection credentials for the wireless access point;

using the second network to obtain a unique identifier of the wireless speaker package; and using the unique identifier of the wireless speaker package to establish communication between the wireless speaker package and the mobile computing device over the first network.

2. The method of claim 1 wherein the mobile computing device is one of a smartphone and a tablet.

3. The method of claim 1 wherein the first network is a WiFi network.

4. The method of claim 1 wherein the second network is a Bluetooth Low Energy (BLE) network.

5. The method of claim 1 further comprising, after obtaining a unique identifier of the wireless speaker package, disabling the connection between the wireless speaker package and the mobile computing device over the second network.

6. The method of claim 1 wherein the unique identifier comprises an IP address.

7. A mobile computing device, comprising:

a processor; and memory comprising instructions which when executed by the processor cause the mobile device to:

establish a connection to a wireless speaker package over a second wireless network, while maintaining communication with a wireless access point over a first wireless network, wherein the communication over the first wireless network is via a first wireless communication protocol and the communication over the second wireless network is via a second wireless communication protocol, wherein the first and second wireless communication protocols are different;

provide credentials over the second wireless network to the wireless speaker package which allow the wireless speaker package to establish communication with the wireless access point over the first wireless network;

drop the connection to the wireless speaker package over the second wireless network upon receiving confirmation that the wireless speaker package established communication with the wireless access point over the first wireless network;

obtain a unique identifier of the wireless speaker package using the second wireless network; and use the unique identifier of the wireless speaker package to establish communication between the mobile computing device and the wireless speaker package over the first wireless network.

8. The mobile computing device of claim 7 wherein the first network is a WiFi network and the second network is a Bluetooth Low Energy (BLE) network.

9. The mobile computing device of claim 7 wherein the unique identifier comprises an IP address.

10. A wireless speaker package, comprising:

an electro-acoustic transducer;

a processor; and memory comprising instructions which when executed by the processor cause the wireless speaker package to:

establish a connection with a mobile computing device via a second wireless network;

receive credentials from the mobile computing device over the second wireless network;

use the credentials to establish a connection with a wireless access point over a first wireless network while maintaining the connection with the mobile computing device over the second wireless network, wherein communication over the first wireless network is via a first wireless communication protocol and communication over the second wireless network is via a second wireless communication protocol, wherein the first and second wireless communication protocols are different;

send a unique identifier of the wireless speaker package to the mobile computing device; and establish, using the unique identifier of the wireless speaker package, communication between the mobile computing device and the wireless speaker package over the first network.

11. The wireless speaker package of claim 10 wherein the first network is a WiFi network and the second network is a Bluetooth Low Energy (BLE) network.

12. The wireless speaker package of claim 10 wherein the unique identifier comprises an IP address.

* * * * *